(12) United States Patent
Boraas et al.

(10) Patent No.: US 8,301,481 B2
(45) Date of Patent: Oct. 30, 2012

(54) MULTIPLE LAYER MANUFACTURING LINE REJECTION MANAGEMENT SYSTEM

(75) Inventors: Michael A. Boraas, Elgin, MN (US); Biao Cai, Carmel, NY (US); Jeffrey G. Komatsu, Kasson, MN (US); John S. Maresca, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1768 days.

(21) Appl. No.: 11/162,477

(22) Filed: Sep. 12, 2005

(65) Prior Publication Data

US 2007/0061186 A1 Mar. 15, 2007

(51) Int. Cl.
*G06F 17/30* (2006.01)
(52) U.S. Cl. ...................................................... 705/7.29
(58) Field of Classification Search .................. 705/10, 705/7.29; 700/95, 110, 115
See application file for complete search history.

(56) References Cited

U.S. PATENT DOCUMENTS

| | | | | |
|---|---|---|---|---|
| 6,115,643 A * | 9/2000 | Stine et al. | ...... | 700/110 |
| 6,381,509 B1 * | 4/2002 | Thiel et al. | ...... | 700/115 |
| 6,446,017 B1 * | 9/2002 | Skidmore | ...... | 702/81 |
| 6,449,597 B1 * | 9/2002 | McGill | ...... | 705/35 |
| 7,174,233 B1 * | 2/2007 | Blackshear et al. | ...... | 700/109 |
| 2002/0059010 A1 * | 5/2002 | Ogawa et al. | ...... | 700/110 |
| 2002/0198618 A1 * | 12/2002 | Madden et al. | ...... | 700/101 |
| 2005/0071032 A1 * | 3/2005 | Urabe | ...... | 700/109 |
| 2005/0119776 A1 * | 6/2005 | Nakamura | ...... | 700/108 |
| 2007/0061186 A1 * | 3/2007 | Boraas et al. | ...... | 705/10 |

* cited by examiner

*Primary Examiner* — Beth V Boswell
*Assistant Examiner* — Ernest A Jackson
(74) *Attorney, Agent, or Firm* — Yuanmin Cai

(57) ABSTRACT

A data processing system for analyzing rejection rejections in a manufacturing process having more than one level of manufacture stores test results from an nth-level test for review by an OEM and, subject to consent of the nth level vendor, for review by a vendor on a lower level. The data for rejection analysis is linked to data in a manufacturing floor control system.

17 Claims, 6 Drawing Sheets

MULTIPLE LAYER MANUFACTURING LINE REJECTION MANAGEMENT SYSTEM

TECHNICAL FIELD

The field of the invention is that of tracking the causes of failure in complex systems having more than one level of manufacture.

BACKGROUND OF THE INVENTION

In modern manufacturing, such as manufacturing computers or other complex systems, the party controlling the process, often referred to as the original equipment manufacturer (OEM) procures individual components, subsystems such as disk drive controller or systems such as a general purpose computer from a number of suppliers.

It is evident that the OEM must have some way of tracking the systems being manufactured and the components, subsystems, etc. that are to be assembled to form the products, so that the OEM knows that sufficient components are on hand or on order to complete the products being ordered by the agreed shipping date. Such systems are generally referred to as manufacturing floor control systems.

In parallel, there has been work done on tracking the quality of components, subsystems, etc. supplied by the various suppliers. Two common types of analysis are failure analysis (FA), which concentrates on the cause of the failure of a component and disposition trend analysis (DTA), which emphasizes changes over time. Causes of failure may include not meeting specifications when shipped (because of a manufacturing defect), damage during assembly, design failures (the component was assembled correctly, but does not perform as intended), etc. Changes in time may result from untrained operators, change in supplier, etc.

The art could benefit from a system that builds on an existing manufacturing floor control system and permits analysis of failure causes.

SUMMARY OF THE INVENTION

The invention relates to a method, computer program and data processing system that stores test data from the test of a component, subsystem, or system in a rejection tracking system and relates the test data to other data about that particular item.

A beneficial feature of the invention is that the supplier on the nth level performs the test on a unit that it has made, the results being accessible to the OEM, and optionally permits suppliers on one or more previous levels to review the test results.

Another feature of the invention is that the test data is used to analyze changes in the rejection rate of items in the final system.

DETAILED DESCRIPTION

Figure 1A:
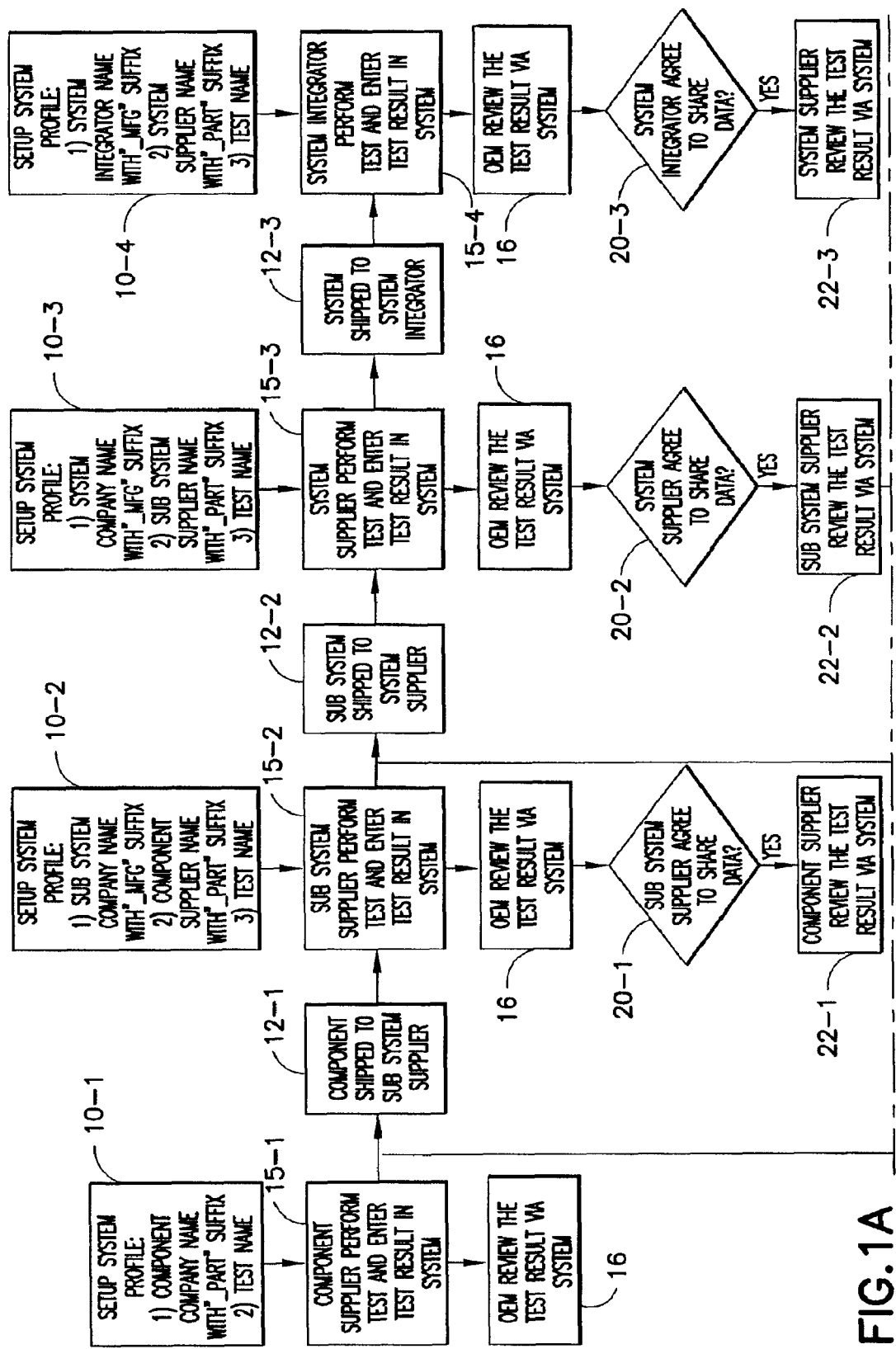
FIG. 1 shows a flow chart of the overall process.
Figures 1, 1A, 1B:
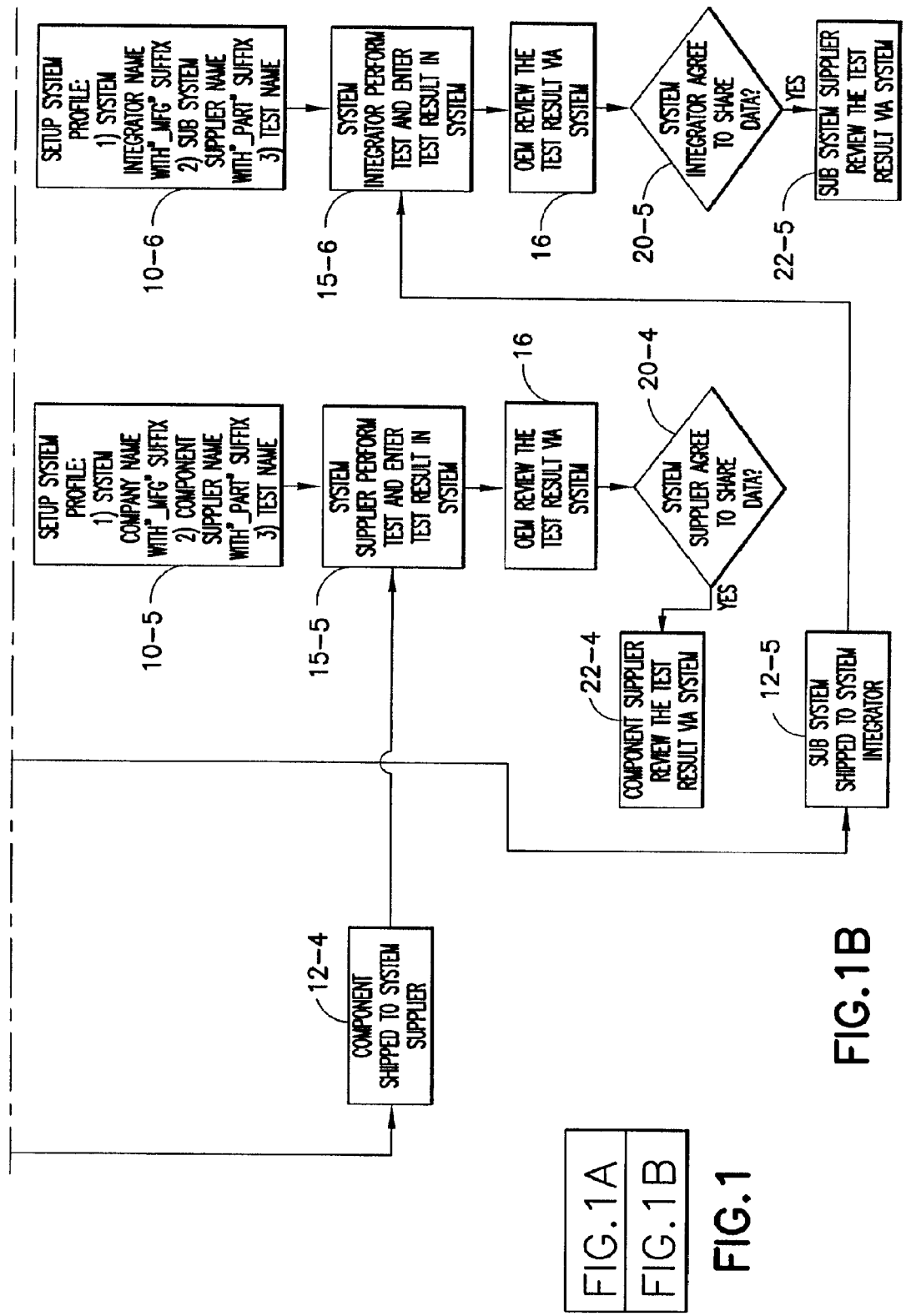

FIG. 1 shows a flow chart illustrating the steps in a typical sequence of tests on components of a final system. In this example, there are four levels of supplier—from component supplier contributing items at the lowest (first) level of integration, followed by subsystem suppliers on the second level, then system suppliers on the third level who combine subsystems to produce the next level of integration, and then the systems integrators who configure systems to meet the particular requirements of a customer.

The OEM, who is the party that controls the process and is responsible for the end product is typically the system vendor, but may exist at any level. The suppliers may be independent of the OEM or groups within the OEM's control and corporate family.

At each level, there may be several suppliers and the identity of the suppliers may change over time.

At the component level, in the upper left corner of FIG. 1, the component supplier enters identifying data into a database in block 10-1 that will be related to the existing manufacturing floor control system that the OEM has in place, performs a test on the product and enters the test result data into the system in block 15-1. The OEM has the ability to review the test data (block 16), not only to check that sufficient parts are in process to meet orders on hand, but also to analyze the quality of the parts.

Continuing on the upper level of the figure, the components are shipped to a subsystem supplier in block 12-1. The subsystem vendor assembles a subsystem from these and other parts and performs a subsystem test and enters the data in block 15-2. The subsystem vendor has previously entered its identifying data in block 10-2. The OEM has the ability to review this data (block 16).

A new feature on the second and later levels is that, subject to agreement of the subsystem vendor (block 20-1), the component supplier can also review the subsystem test results (block 22-1). The condition of consent is added because the subsystem test may reveal competitively sensitive information that the subsystem vendor is not willing to reveal, especially if the component supplier is part of or allied with a competing subsystem vendor.

Continuing along the upper portion of the figure, the subsystem is shipped to a system vendor (block 12-2) and the system vendor enters data in block 10-3. A system test is performed in block 15-3 and the result is entered in the system. The OEM again has the ability to review the test results (block 16). Similar to the preceding test, the subsystem vendor has the ability to review the test data (block 22-2) subject to the consent of the system vendor (block 20-2).

At the upper right corner of the Figure, a system integrator performs similar steps of entering data (block 10-4), performing a test (block 15-4), review by OEM (block 16) and review by supplier on the preceding level (22-3) subject to consent of the current supplier (block 20-3).

In the lower half of the figure, alternative paths are shown in which a lower level supplier skips a level; i.e. a component supplier ships a component to a system supplier, rather than a subsystem supplier (block 12-4).

The same steps are followed as in block 10-2 et. seq. Data is entered in block 10-5, the test is performed and results entered in block 15-5 and the OEM reviews the data in block 16. If the system supplier has agreed to share the test results (block 20-4) the component supplier may review them (block 22-4), Lastly, in the lower right of the figure, the same set of steps is performed for a system integrator receiving a subsystem. Data is entered in block 10-6, the test is performed and results entered in block 15-6 and the OEM reviews the data in block 16. If the system integrator has agreed to share the test results (block 20-5) the subsystem supplier may review them (block 22-5), The various steps may be described generally as: the (nth level) supplier on the current level performs its assigned task, enters data, runs an appropriate test that is reviewed by the OEM and optionally reviewed by the (n-1, n-2, etc.) lower level supplier that has supplied the item (component, subsystem, system) in question.

Figure 2:
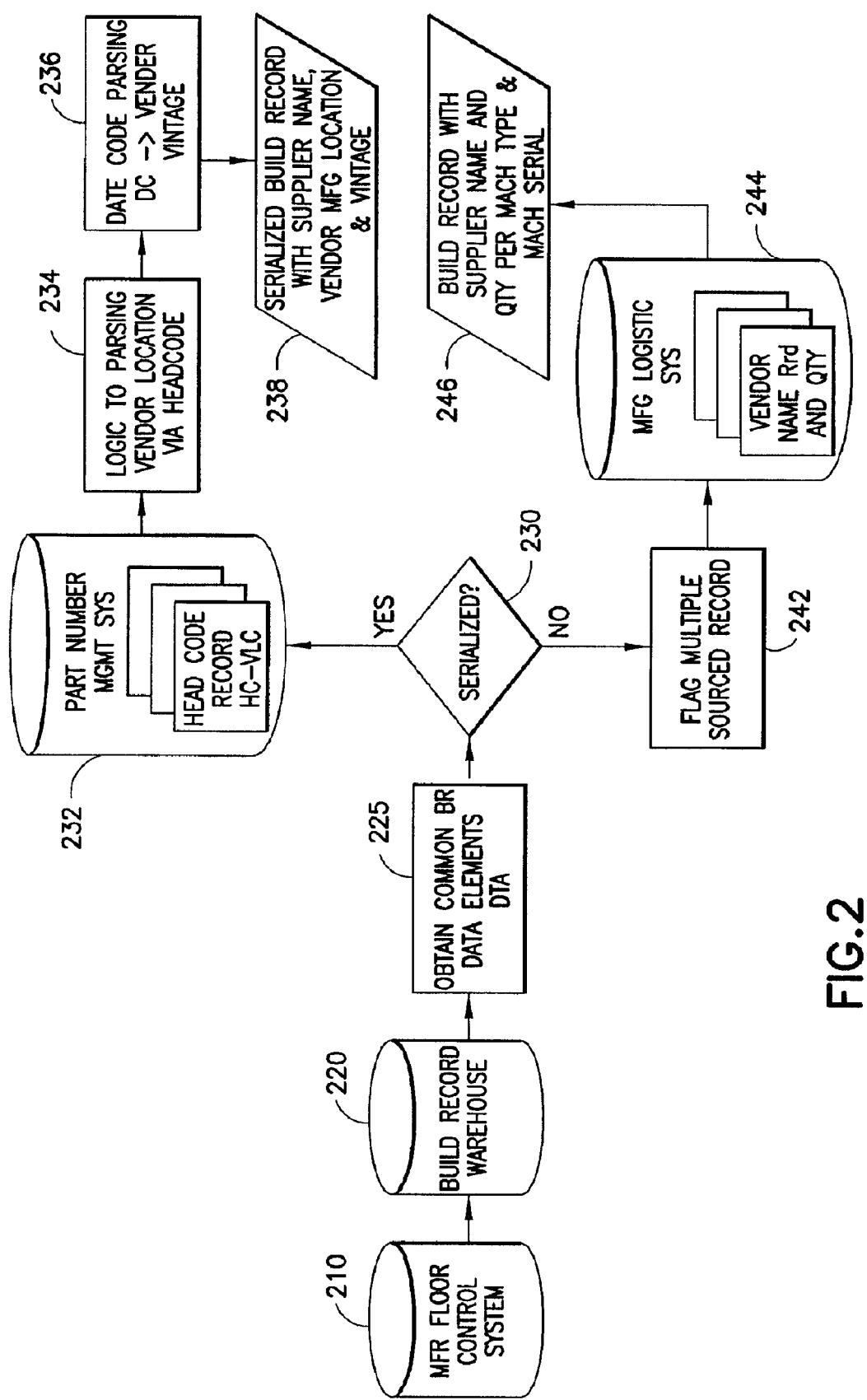
FIG. 2 shows the process of building records to apply Disposition Trend Analysis to the test data.

FIG. 2 illustrates the process of building a data record to be used for disposition Trend Analysis (DTA), focusing on the time development of the disposition of components and subsystems. In particular, an increase in the failure rate of an item (component, subsystem or system) is of interest.

On the left, a symbol 210 represents the existing Manufacturing Floor Control System. Symbol 220 represents storage of data and commands for building the supplementary records that, together with the data in the floor control system, supplies the required data.

Block 225 represents the step of obtaining common data elements for the DTA process. Examples of common data elements are the system manufacturing location, the machine type, the machine serial number, manufacturing date and time, assembly station, operator id, Production Part Number (PPN), part serial number, Quantity, etc. There are many ways of relating two databases and no particular method is mandated by the present invention.

At the center of the figure, diamond 230 indicates a branch between a part that has a serial number and one that does not. Serialized parts are processed in the upper branch, where block 232 indicates a part number management system that has records keyed by serial number. Block 234 represents conventional logic parsing the vendor location via data in the part number management system. Block 236 indicates the application of the date code to indicate the particular vintage. Block 238 indicates the summary in a record with the supplier name, manufacturing location and vintage.

On the lower branch, parts without a serial number are processed by setting a flag to indicate that the part has multiple sources, followed by application of a logistic system (block 244) containing vendor names and the quantity of parts supplied by the vendors. Block 246 indicates a record with the name of the most probable vendor and the number of parts supplied per machine type.

The data described above may be separated from the manufacturing control system and located separately if the use of this option would impact adversely the operation of the manufacturing control system; e.g. by using the disk storage so much that operation of the Manufacturing Floor Control System is slowed down.

Figure 3:
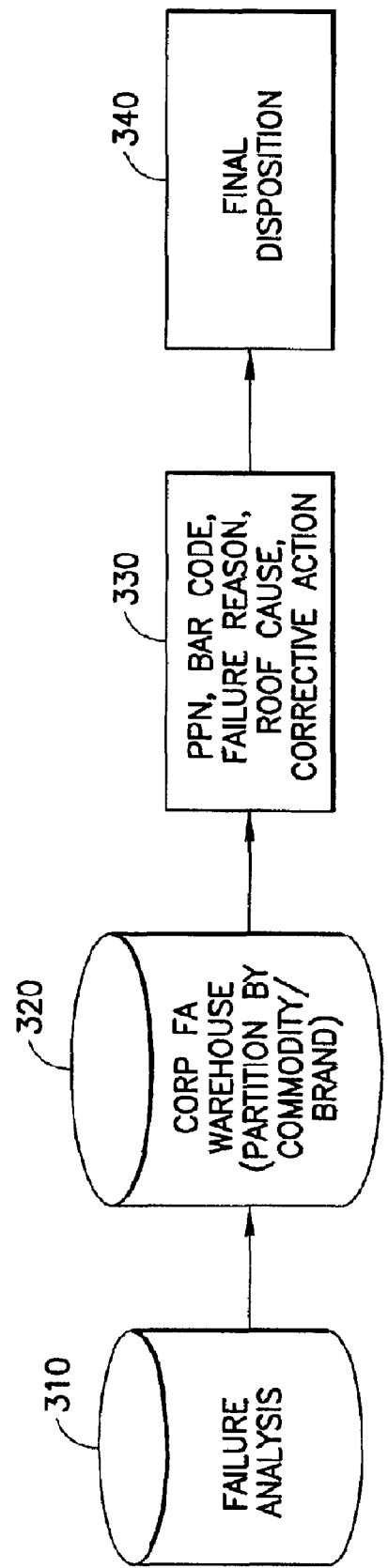
FIG. 3 shows preparation of data for the application on failure analysis.

FIG. 3 illustrates steps in processing Failure Analysis (FA) data for selected items. Symbol 310 represents data relevant to failure analysis taken from the Manufacturing Floor Control System and/or other databases. Symbol 320 represents the process of partitioning the data by commodity, brand or other category. Block 330 indicates the grouping of data by part number, bar code or other label and the assignment of failure reason, root cause of the failure and corrective action taken. Block 340 represents the final disposition of the item. The purpose of this classification is to decide who is responsible for the failure. The failure may be in a part or subsystem; a design flaw, an execution error in manufacture, or other cause.

Figure 4:
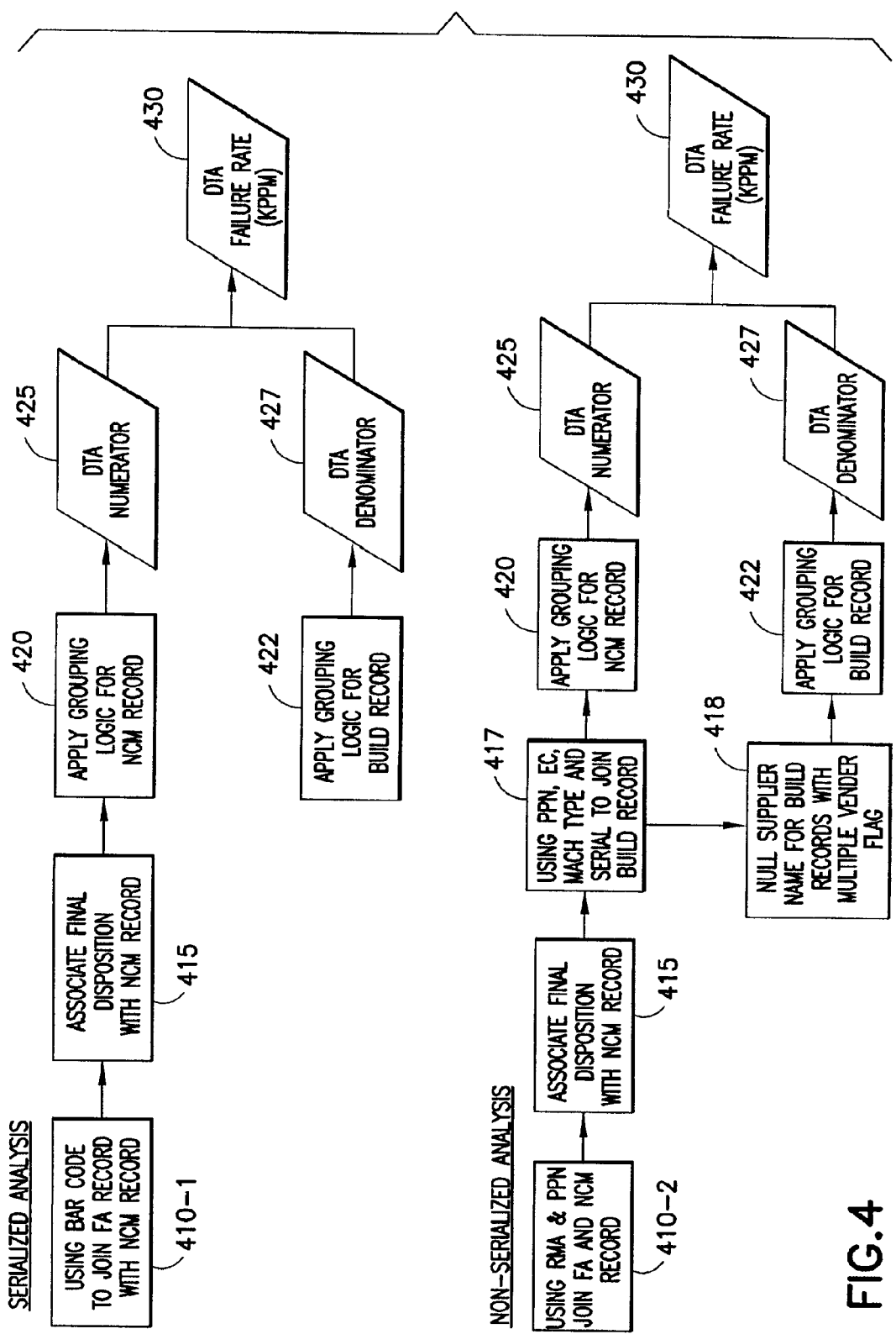
FIG. 4 shows the failure rate calculation.

FIG. 4 illustrates steps in calculating the failure rate, to be plotted in relevant groups over a relevant time period. The purpose of grouping is to group the data according to common properties, such as parts supplied from a particular vendor and/or a particular location, so that sources of trends may be identified that would be "washed out" if data from many sources were presented together. Alternatively, if it is suspected that a design by the OEM is at fault, it is relevant to group all items manufactured to that design, no matter what supplier made them.

FIG. 4 shows separate branches for parts having serial numbers and parts without. On the upper branch, block 410-1 indicates using a bar code or other label to join data from the FA records with data from the non-conforming material (NCM) records. Block 415 represents the association of the final disposition data with the NCM records. Block 420 represents grouping relevant records from the NCM data to from the numerator for the DTA calculation in block 425. Similarly, block 422 represents grouping data from the build record according to the same criteria as in block 420 to form the denominator of the DTA calculation in block 427. With the two numbers grouped the same way, the number of defective items in the NCM category is divided by the total number of items processed in the manufacturing system to form the DTA ratio.

The lower branch is the same, with changes that reflect the lack of serial number to identify the parts or systems. Block 410-2 groups data using the PPN and any other convenient identifier to join the FA records with the NCM records. Block 415 is the same in both branches. Block 417 shows the use of PPN, engineering change (EC) number, machine type and machine serial to identify candidates for the relevant category. Block 420 then applies grouping to the result of the block 417 process to form the numerator of the DTA calculation in block 425. Block 418 processes the output of block 417 by removing the supplier indication where a part has multiple sources. Block 422 groups the data from block 418 as in the upper branch to form the denominator of the DTA calculation in block 427. The result is calculated in block 430.

Figure 5:
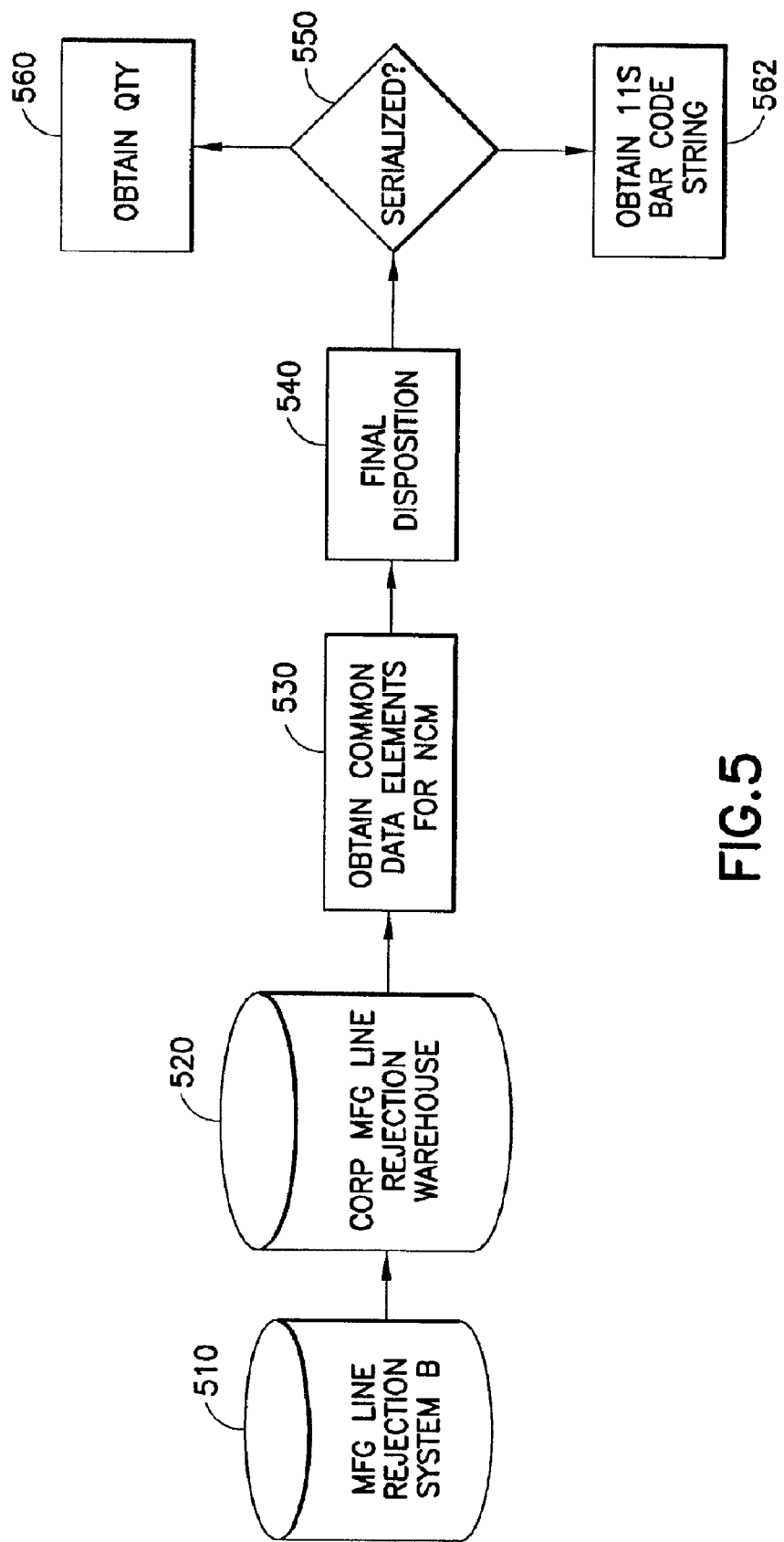
FIG. 5 shows preparation of NCM data for DTA.

FIG. 5 shows steps in forming the NCM data. Symbol 510 represents relevant data from the Manufacturing Control System. Symbol 520 represents the storage of relevant data from the manufacturing data base. Block 530 represents steps in assembling relevant data to join the manufacturing data records with the NCM records. Such data may be the test description, the defect type, the part type, the tag number, part number, EC level, machine type, model and serial number, action code, etc. There are many ways to link data in two databases and not all the data in this list may be required in a particular instance.

Block 540 shows the addition of the final disposition of the part in question. Diamond 550 represents a branch between parts that have serial numbers and those that do not. Block 560 represents summing the quantities from non-serialized parts. Block 562 represents recording part specific serial number information for serialized parts.

The Figures show various symbols that represent data and also schematically represent the hardware such as disk drives and processing apparatus, e.g. general purpose computers, to process the data.

The invention may be implemented in a data processing system including one or more central processing units and one or more data bases. Illustratively, a data processing system according to the invention links to an existing Manufacturing Floor Control System, though a stand-alone system may also be used.

The invention may employ an article of manufacture in computer readable form (e.g. a CD Rom, tape, etc.) comprising means for performing a method for operating a computer system having a program to carry out the steps of the methods described herein.

While the invention has been described in terms of a single preferred embodiment, those skilled in the art will recognize that the invention can be practiced in various versions within the spirit and scope of the following claims.

What is claimed is:

1. A method of tracking part usage and defect information in a rejection tracking system by an original equipment manufacturer (OEM), said rejection tracking system (RTS) being adapted for an assembly of said OEM having multiple levels of sub-assemblies from multiple levels of sub-tier suppliers, the method comprising the steps of:
   providing said RTS to a component supplier on a first level of said assembly to enter component test data from a component test;
   providing said RTS to a subsystem supplier on a second level of said assembly to enter subsystem test data from a subsystem test;
   providing said RTS to a system supplier on a third level of said assembly to enter system test data from a system test;
   storing said component test data, said subsystem test data, and said system test data as supplier quality trend data;
   reviewing and analyzing quality of said component test data, said subsystem test data and said system test data, and relating said component test data, said subsystem test data and said system test data with data from a manufacturing floor management system to identify their respective suppliers;
   identifying, based on said reviewing and analyzing, at least one component without a serial number and setting a flag to indicate that said at least one component has multiple source suppliers;
   calculating, by said RTS, a probability that at least one of the multiple source suppliers is the component supplier of said at least one component using said stored supplier quality trend data and a number of parts supplied by each of said multiple source suppliers; and
   determining that a sufficient number of quality parts at said component supplier, said subsystem supplier, and said system supplier are in process to meet orders on hand based upon said reviewing, analyzing, and calculating.

2. A method according to claim 1, further comprising a step of:
   performing at least one of a failure analysis and a disposition trend analysis on said component test data, said subsystem test data and said system test data.

3. A method according to claim 2, in which said disposition trend analysis reviews the failure rate of a particular vendor over a period of time.

4. A method according to claim 2, in which said disposition trend analysis reviews the failure rate of an item supplied by more than one vendor over a period of time.

5. A method according to claim 1, further comprising a step of
   providing said RTS to a system integrator on a fourth level of said assembly to let entering system integration test data from a system integration test; and
   reviewing said system integration test data.

6. A method according to claim 5, further comprising a step of:
   performing at least one of a failure analysis and a disposition trend analysis on said component test data, said subsystem test data, and said system test data.

7. A method according to claim 1, further comprising:
   allowing review of said test data performed on said second level of said assembly by a supplier on said first level of said assembly.

8. A method according to claim 1, further comprising:
   allowing review of said test data performed on said third level of said assembly by a supplier on said second level of said assembly.

9. A method according to claim 1, wherein said component supplier ships components to said subsystem supplier; said subsystem supplier ships subsystems to said system supplier; and said system supplier ships system to a system integrator, and wherein said system integrator configures said system to meet requirement of a customer.

10. A method according to claim 7, wherein said allowing review of said test data comprises said subsystem supplier giving a consent for reviewing of said test data to said component supplier, said consent being subject to an agreement between said subsystem supplier at said second level of said assembly and said component supplier at said first level of said assembly.

11. A data processing system for tracking part usage and defect information, in a rejection tracking system (RTS), comprises a manufacturing floor control system adapted for:
   entering component test data from a component test performed by a component supplier on a first level of an assembly of an original equipment manufacturer (OEM);
   entering subsystem test data from a subsystem test by a subsystem supplier on a second level of said assembly;
   entering system test data from a system test by a system supplier on a third level of said assembly;
   storing said component test data, said subsystem test data, and said system test data as supplier quality trend data;
   reviewing and analyzing quality of said component test data, said subsystem test data and said system test data, and relating said component test data, said subsystem test data and said system test data with data from a manufacturing floor management system to identify their respective suppliers;
   identifying, based on said reviewing and analyzing, at least one component without a serial number and setting a flag to indicate that said at least one component has multiple source suppliers;
   calculating, by said RTS, a probability that at least one of the multiple source suppliers is the component supplier of said at least one component using said stored supplier quality trend data and a number of parts supplied by each of said multiple source suppliers; and
   determining that a sufficient number of quality parts at their identified respective suppliers are in process to meet orders on hand.

12. A system according to claim 11,
   wherein said manufacturing floor control system is adapted for performing at least one of a failure analysis and a disposition trend analysis on said component test data, said subsystem test data and said system test data.

13. A system according to claim 12, in which said disposition trend analysis reviews the failure rate of a particular vendor over a period of time.

14. A system according to claim 12, in which said disposition trend analysis reviews the failure rate of an item supplied by more than one vendor over a period of time.

15. A system according to claim 11, wherein said manufacturing floor control system is adapted for entering system integration test data from a system integration test by a system integrator on a fourth level of said assembly.

16. A system according to claim 15, wherein said manufacturing floor control system is adapted for performing at least one of a failure analysis and a disposition trend analysis on said component test data, said subsystem test data and said system test data.

17. An article of manufacture in machine-readable form upon which stored a set of instructions that, when executed by a machine, result in providing a rejection tracking system (RTS) to a component supplier on a first level of an assembly to enter component test data from a component test;

providing the RTS to a subsystem supplier on a second level of the assembly to enter subsystem test data from a subsystem test;

providing the RTS to a system supplier on a third level of the assembly to enter system test data from a system test;

storing said component test data, said subsystem test data, and said system test data as supplier quality trend data and reviewing and analyzing quality thereof;

relating the component test data, subsystem test data and system test data with data from a manufacturing floor management system to identify their respective suppliers;

identifying, based upon said reviewing and analyzing, at least one component that does not have a serial number and setting a flag to indicate that said at least one component has multiple source suppliers;

calculating, by the RTS, a probability that at least one of the multiple source suppliers is the component supplier of said at least one component by applying said stored supplier quality trend data and a number of parts supplied by each of said multiple source suppliers; and determining that a sufficient number of quality parts at their identified respective suppliers are in process to meet orders on hand.

* * * * *